(12) United States Patent
Chen et al.

(10) Patent No.: US 10,417,052 B2
(45) Date of Patent: Sep. 17, 2019

(54) INTEGRATED HETEROGENEOUS PROCESSING UNITS

(71) Applicant: Hewlett Packard Enterprise Development LP, Houston, TX (US)

(72) Inventors: Yuan Chen, Sunnyvale, CA (US); Vanish Talwar, Campbell, CA (US); Naila Farooqui, Palo Alto, CA (US); Indrajit Roy, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 223 days.

(21) Appl. No.: 15/522,354

(22) PCT Filed: Oct. 31, 2014

(86) PCT No.: PCT/US2014/063479
§ 371 (c)(1),
(2) Date: Apr. 27, 2017

(87) PCT Pub. No.: WO2016/068999
PCT Pub. Date: May 6, 2016

(65) Prior Publication Data
US 2017/0315847 A1 Nov. 2, 2017

(51) Int. Cl.
*G06F 9/50* (2006.01)
*G06F 11/36* (2006.01)
(Continued)

(52) U.S. Cl.
CPC .......... *G06F 9/5044* (2013.01); *G06F 9/3877* (2013.01); *G06F 9/5033* (2013.01);
(Continued)

(58) Field of Classification Search
None
See application file for complete search history.

(56) References Cited

U.S. PATENT DOCUMENTS 8,375,392 B2   2/2013   Becchi et al.
8,707,314 B2   4/2014   Gummaraju et al.
(Continued)

FOREIGN PATENT DOCUMENTS

WO   WO-2014040003   3/2014

OTHER PUBLICATIONS

International Searching Authority, The International Search Report and the Written Opinion, PCT/US2014/063479, dated May 29, 2015, 9 Pages.
(Continued)

*Primary Examiner* — Qing Yuan Wu
(74) *Attorney, Agent, or Firm* — Hewlett Packard Enterprise Patent Department (57) ABSTRACT

According to an example, an instruction to run a kernel of an application on an apparatus having a first processing unit integrated with a second processing unit may be received. In addition, an application profile for the application at a runtime of the application kernel on the second processing unit may be created, in which the application profile identifies an affinity of the application kernel to be run on either the first processing unit or the second processing unit, and identifies a characterization of an input data set of the application. The application profile may also be stored in a data store.

15 Claims, 7 Drawing Sheets

(51) Int. Cl.
*G06F 9/38* (2018.01)
*G06F 11/34* (2006.01)
*G06F 9/48* (2006.01)

(52) U.S. Cl.
CPC ...... *G06F 11/3466* (2013.01); *G06F 11/3644* (2013.01); *G06F 9/4881* (2013.01); *G06F 2212/2542* (2013.01); *Y02D 10/22* (2018.01)

(56) References Cited

U.S. PATENT DOCUMENTS

| | | |
|---|---|---|
| 8,782,645 B2 | 7/2014 | Breternitz et al. |
| 2011/0057937 A1 | 3/2011 | Wu et al. |
| 2011/0088038 A1* | 4/2011 | Kruglick .................. G06F 9/54 718/104 |
| 2012/0069029 A1 | 3/2012 | Bourd et al. |
| 2012/0079298 A1 | 3/2012 | Majumdar et al. |
| 2013/0007774 A1 | 1/2013 | Munshi et al. |
| 2013/0254783 A1 | 9/2013 | McGuire et al. |
| 2014/0052965 A1 | 2/2014 | Sarel |
| 2014/0259016 A1 | 9/2014 | Lottes et al. |

OTHER PUBLICATIONS

Oh et al., Automatic Runtime Selection of Best Hardware for Data-Parallel JavaScript Kernels via Lifelong Profiling, Suwon, Korea, Retrieved Oct. 31, 2014, 2 Pages.

* cited by examiner

INTEGRATED HETEROGENEOUS PROCESSING UNITS

BACKGROUND

An ever-increasing number of integrated central processing unit (CPU) and graphics processing unit (GPU) platforms are being used in computing systems. In integrated CPU-GPU platforms, a CPU and a GPU are typically integrated onto a single die and share the same physical memory. A GPU may include multiple processing elements that are suited for executing the same instruction in parallel on different data streams and may thus be designed to be particularly suited for graphics processing operations. A CPU may function as a host or controlling processor and may be suited for types of processing operations that may not benefit from parallel processing of instructions.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are an apparatus having integrated heterogeneous processing units, a method for managing the apparatus, and a non-transitory computer-readable storage medium on which is stored machine readable instructions for managing the apparatus. The apparatus may have a first processing unit integrated with a second processing unit, in which the second processing unit has different operating characteristics as compared with the first processing unit. According to an example, the first processing unit is a central processing unit (CPU) and the second processing unit is a graphics processing unit (GPU). The apparatus may also include an apparatus management module that is to create an application profile for an application.

The application profile may be created from information obtained through dynamic instrumentation of application kernels of the application during runtime of the application kernels. In this regard, the application profile may be generated online and without having to access the source code of the application. The dynamic instrumentation may be implemented for graph applications where performance is dependent on the type of the graph. In addition, the overhead associated with dynamic instrumentation of the application kernels may be reduced through selective instrumentation, in which for instance, only a first few iterations of the application kernels is instrumented.

As used herein, graph applications may refer to graph analytics, in which useful information may be extracted from graphs. Graphs may be used to capture and represent relationships between people, organizations, devices, etc. Examples of graphs may include social networks, large network systems, natural language understanding systems, etc. For instance, the structure of a website may be represented by a directed graph, in which the vertices represent web pages and the edges represent links from one page to another. Graph analytics may be used, for instance, to uncover insights about customers, products, operations, etc.

According to an example, the application profile may identify an affinity of an application kernel of the application to be processed on either the first processing unit (e.g., a CPU) or the second processing unit (e.g., a GPU) and may identify a characterization of an input data set of the application. The affinity of the application kernel may depend upon both the application kernel type and the input data set. The application profile may also identify a characterization of the application's memory contention. In one example, the application profile may be used to determine which of the first processing unit and the second processing unit is to process an application kernel of a subsequently received processing request with a different input data set based, for instance, on the affinity of the application kernel identified in the application profile. By processing the application kernels in this manner, an increase in overall performance of applications on the first and second processing units may be achieved. In another example, an application kernel may have different GPU implementations and an application profile may identify which kernel implementation is to be used to improve the overall performance of the applications run on the GPU.

In another example, a plurality of application profiles for a plurality of applications may be used to schedule processing of multiple applications on the apparatus. For instance, the multiple applications may be scheduled for processing on the first and second processing units such that the multiple applications are processed on the unit to which the applications have greater affinities as identified by the application profiles. In addition, the multiple applications may be scheduled such that memory contention in the performance of the multiple applications is minimized. By scheduling the multiple applications in this manner, an increase in energy efficiency and performance of the first and second processing units, which may respectively be a CPU integrated with a GPU, may be achieved. For instance, the multiple applications may be processed using relatively less energy and in a relatively less amount of time as compared with other scheduling techniques.

Figure 1:
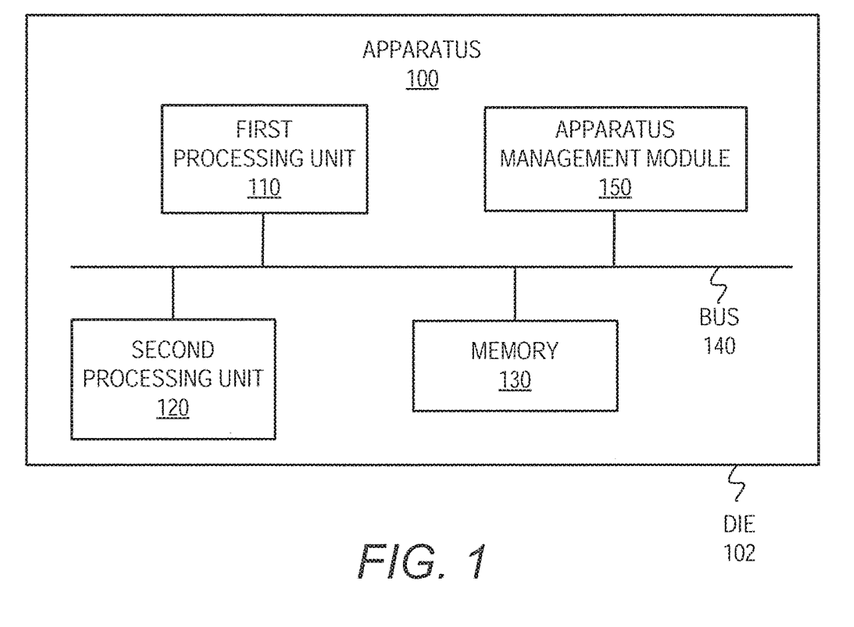
FIG. 1 is a simplified schematic diagram of an apparatus, in which various aspects of the methods disclosed herein may be implemented, according to an example of the present disclosure.

With reference first to FIG. 1, there is shown a simplified diagram of an apparatus 100, on which various aspects of the methods disclosed herein may be implemented, according to an example. It should be understood that the apparatus 100 depicted in FIG. 1 may include additional elements and that some of the elements depicted therein may be removed and/or modified without departing from a scope of the apparatus 100. For instance, the apparatus 100 may include an interface to enable data to be communicated into and out of the apparatus 100.

As shown in FIG. 1, the apparatus 100 may include a first processing unit 110, a second processing unit 120, a memory 130, a bus 140, and an apparatus management module 150. The apparatus 100 may also include a die 102 or equivalently, a chip, a circuit, etc., on which the first processing unit 110, the second processing unit 120, the memory 130, the bus 140, and the apparatus management module 150 are integrated. Generally speaking, the second processing unit 120 has different operating characteristics as compared with the first processing unit 110, and thus, the apparatus 100 may be construed as a heterogeneous apparatus. The different operating characteristics may be, for instance, the efficiency with which the processing units 110, 120 process multiple instructions, the speeds at which the processing units 110, 120 process different types of input data, etc. By way of example, the first processing unit 110 may have operating characteristics that enable the first processing unit 110 to be better suited for processing applications that exhibit larger regions of serialized code or irregular control-flow. In this example, the second processing unit 120 may have operating characteristics that enable the second processing unit 120 to be better suited for processing applications that feature minimal synchronization, uniform control flow; and regular memory access patterns.

As discussed in greater detail below, processing of an application (e.g., an application kernel of the application) on one of the first processing unit 110 and the second processing unit 120 as compared with the other one of the units 110, 120 may result in different performance improvements. That is, the costs, e.g., efficiency, time-savings, power-savings, etc., of processing an application kernel may be affected by the application kernel being processed by the first processing unit 110 or the second processing unit 120. In addition, the benefit that an application derives from the first processing unit 110 or the second processing unit 120 may depend on runtime characteristics, such as input data sets, control-flow irregularity, and memory bandwidth requirements.

According to an example, the first processing unit 110 is a central processing unit (CPU) and the second processing unit 120 is a graphics processing unit (GPU). In other examples, the first processing unit 110 is a CPU and the second processing unit 120 is another CPU that has different operating characteristics from the first processing unit 110. In other examples, the first processing unit 110 and the second processing unit 120 are both GPUs but have different operating characteristics. In other examples, the first processing unit 110 is a CPU and the second processing unit 120 is another processing unit other than CPU and GPU, such as a field-programmable gate array (FGPA). In yet other examples, the apparatus 100 may include multiple first processing units 110 and/or multiple second processing units 120. In still further examples, the first processing unit 110 and/or the second processing unit 120 may include multiple cores.

In an example in which the first processing unit 110 is a CPU, the first processing unit 110 may execute control logic that controls the operation of the apparatus 100. The first processing unit 110 may include a cache memory (not shown) that may be used to temporarily hold instructions and/or parameter values during the execution of an application. For example, the cache memory may be used to temporarily hold one or more control logic instructions, values of variables, values of constant parameters, etc., during the execution of control logic instructions on the first processing unit 110. In addition, the first processing unit 110 may include multiple cores that are optimized for sequential serial processing.

In an example in which the second processing unit 120 is a GPU, the second processing unit 120 may execute specialized code for selected functions. In this example, the second processing unit 120 may include a massively parallel architecture that may include thousands of smaller, more efficient cores than a CPU and may include specialized vector instruction processing units, for instance, that may include a Streaming Single Instruction, Multiple Data Extensions (SSE) unit. The second processing unit 120 may be preferable over the first processing unit 110 for the execution of data-parallel code. The second processing unit 120 may include a cache memory and a plurality of processing elements (not shown). Each processing element may be associated with registers and/or private memory and may include one or more of a scalar and vector floating-point units. The processing elements may also include special purpose units such as inverse-square root units and sine/cosine units.

The memory 130 may include non-persistent memory such as dynamic random access memory (DRAM). The memory 130 may hold processing logic instructions, constant values, and variable values during execution of portions of applications or other processing logic. By way of example, the control logic, as well as other processing logic, of the apparatus management module 150 may reside in the memory 130 during execution by the first processing unit 110 of the apparatus management module 150.

The bus 140 generally interconnects the components of the apparatus 100 to each other. In an example in which the first processing unit 110 is a CPU and the second processing unit 120 is a GPU, the bus 140 may be a Radeon™ memory bus (RMB), a fusion compute link (FCL), or the like. As shown in FIG. 1, the bus 140 is an on-chip bus that is integrated onto the die 102. In one regard, therefore, the first processing unit 110 and the second processing unit 120 may share the memory 130 through the bus 140.

The apparatus management module 150 may perform various management functions with regard to the first processing unit 110 and the second processing unit 120. For instance, the apparatus management module 150 may create application profiles of applications, in which the application profiles identify affinities of the applications to be run on the second processing unit 120 and identify characterizations of input data sets of the applications. The affinities of the applications and the characterizations of input data sets are discussed in detail below.

The apparatus management module 150 may store the created application profiles in a data store for future reference. The apparatus management module 150 may also determine, based upon the application profiles, whether subsequently received applications are to be run on the first processing unit 110 or the second processing unit 120. The apparatus management module 150 may further determine and execute, based upon the application profiles, a kernel implementation for an application that may result in an improvement of an overall performance of the application. The apparatus management module 150 may still further determine a schedule for multiple applications to be run on the first processing unit 110 and the second processing unit 120 that, for instance, minimizes the amount of power required to execute the multiple applications. Particularly, for example, the apparatus management module 150 may schedule compute kernels (also called application kernels) to be executed in the first processing unit 110 and the second processing unit 120. A compute kernel may refer to a kernel that may be executed in both of the first processing unit 110 and the second processing unit 120 and may be defined as a function containing instructions declared in a program and executed on data items using a processor.

The apparatus management module 150 may be implemented using software, firmware, hardware, or any combination thereof. When implemented in software, the apparatus management module 150 may be a set of machine readable instructions that when compiled and executed reside in the memory 130. When in source code form and/or compiled executable form, the apparatus management module 150 may be stored in a persistent memory (not shown) or other computer readable storage medium. When implemented in hardware, the apparatus management module 150 may be a circuit component or other hardware device that is positioned on the die 102 or externally to the die 102.

Although the apparatus management module 150 has been depicted as being integrated on the die 102 of the apparatus 100, it should be understood that in other examples, the apparatus management module 150 may be software, firmware, hardware, or any combination thereof that is external to the apparatus 100.

Figure 2:
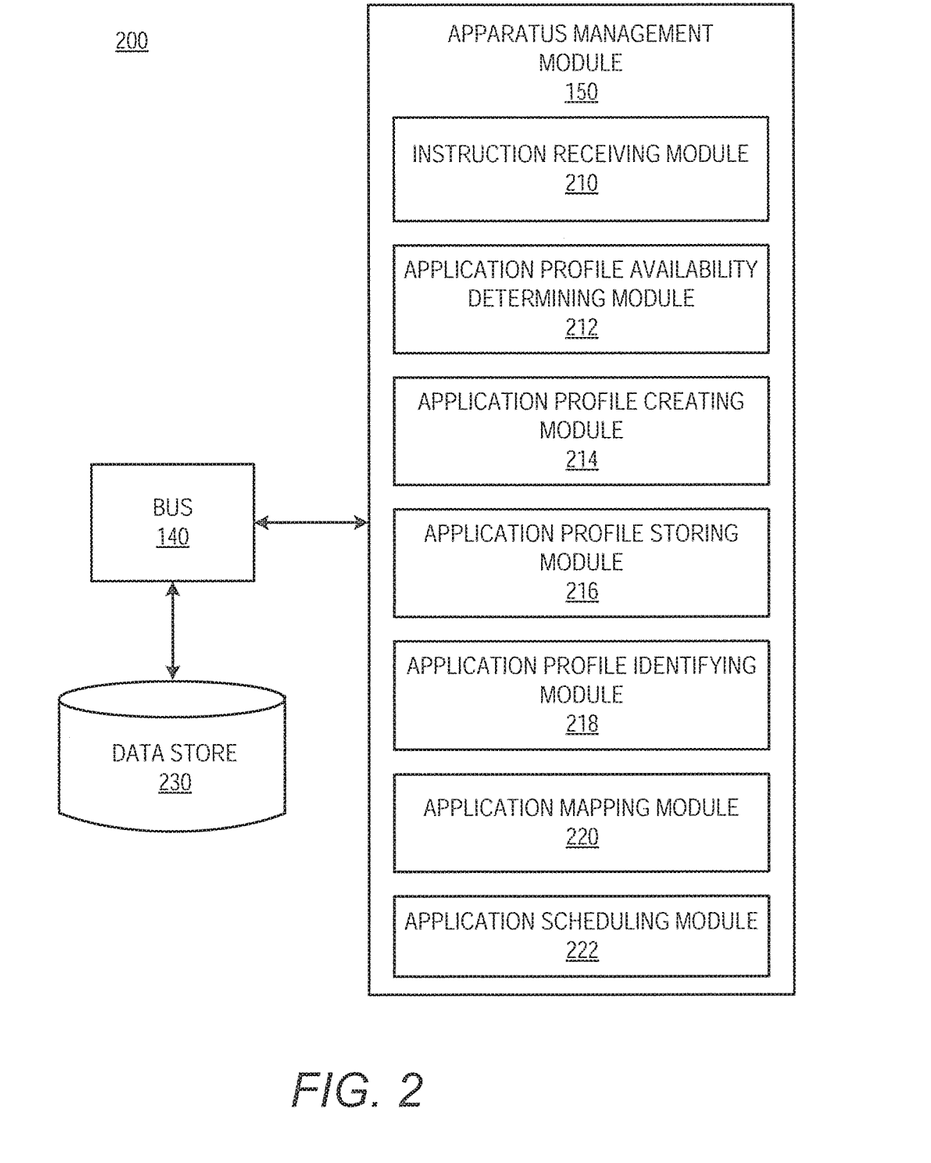
FIG. 2 is a simplified block diagram of the apparatus management module depicted in FIG. 1, according to an example of the present disclosure.

Turning now to FIG. 2, there is shown a simplified block diagram 200 of the apparatus management module 150 depicted in FIG. 1, according to an example. It should be understood that the apparatus management module 150 depicted in FIG. 2 may include additional elements and that some of the elements depicted therein may be removed and/or modified without departing from a scope of the apparatus management module 150.

As shown in FIG. 2, the apparatus management module 150 may include an instruction receiving module 210, an application profile availability determining module 212, an application profile creating module 214, an application profile storing module 216, an application profile identifying module 218, an application mapping module 220, and an application scheduling module 222. As discussed above, the first processing unit 110 may execute or otherwise implement the apparatus management module 150. In a similar regard, the first processing unit 110 may execute or otherwise implement the modules 210-222 of the apparatus management module 150.

As also discussed above, the apparatus management module 150 may be a set of machine readable instructions that is stored on a hardware device. In an example, the apparatus management module 150 is the hardware device. The hardware device may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 210-222 may be software modules, e.g., sets of machine readable instructions, stored in the hardware device.

In another example, the apparatus management module 150 may be a hardware component, such as a chip component, an integrated circuit component, etc., and the modules 210-222 may be hardware modules on the hardware component. In a further example, the modules 210-222 may be a combination of software and hardware modules.

The data store 230 may be used to store various information related to the operation of and/or used by during implementation of the apparatus management module 150, and particularly, the modules 210-222. For instance, the application profile storing module 216 may store application profiles of applications in the data store 230. The data store 230 may be volatile and/or non-volatile memory, such as DRAM, EEPROM, MRAM, phase change RAM (PCRAM), memristor, flash memory, and the like. In addition, or alternatively, the data store 230 may be a device that may read from and write to a removable media, such as, a floppy disk, a CD-ROM, a DVD-ROM, or other optical or magnetic media.

The data store 230 may be integrated on the die 102 of the apparatus 100 or may be external to the apparatus 100. The data store 230 may also be accessible by the apparatus management module 150 while not being accessible by the first processing unit 110 or the second processing unit 120.

Various manners in which the apparatus management module 150 in general, and the modules 210-222 in particular, may be implemented are discussed in greater detail with respect to the methods 300 and 500-700 respectively depicted in FIGS. 3 and 5-7. Particularly, FIGS. 3 and 5-7 respectively depict flow diagrams of methods 300 and 400-700 for managing an apparatus 100 having a first processing unit 110 integrated with a second processing unit 120, according to multiple examples. It should be apparent to those of ordinary skill in the art that the methods 300 and 400 may represent generalized illustrations and that other operations may be added or existing operations may be removed, modified, or rearranged without departing from the scopes of the methods 300 and 500-700. Generally speaking, the apparatus management module 150 depicted in FIG. 2 may implement the methods 300 and 500-700 through implementation of at least some of the modules 210-222.

The descriptions of the methods 300, 500, 600, and 700 are made with reference to the apparatus 100 illustrated in FIG. 1 and the apparatus management module 150 illustrated in FIGS. 1 and 2 for purposes of illustration. It should, however, be clearly understood that apparatuses having other configurations may be implemented to perform the methods 300, 500, 600, and 700 without departing from the scopes of the methods 300, 500, 600, and 700.

According to an example, the first processing unit 110, which may be a CPU, may execute the apparatus management module 150 to implement the methods 300, 500, 600, and 700. In other examples, a processing unit external to the apparatus 100 may execute the apparatus management module 150 to implement the methods 300, 500, 600, and 700.

Figure 3:
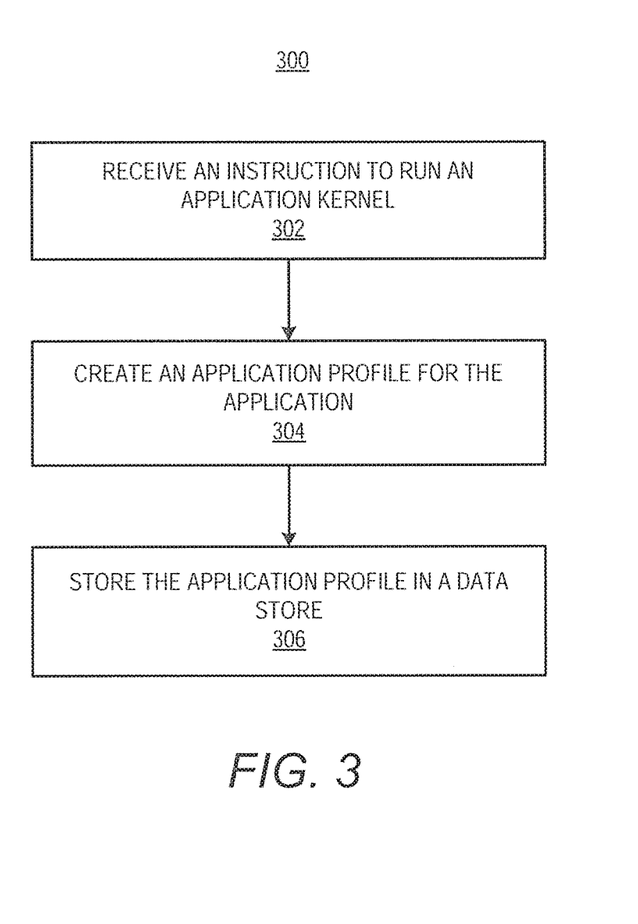
FIGS. 3 and 5-7, respectively, depict flow diagrams of methods for managing an apparatus having integrated heterogeneous processing units, according to examples of the present disclosure.

With reference first to the method 300 depicted in FIG. 3, at block 302, an instruction to run an application kernel of an application on an apparatus 100 having a first processing unit 110 integrated with a second processing unit 120 may be received. For instance, following implementation of the apparatus management module 150 in any of the manners discussed above, the instruction receiving module 210 may receive an instruction to run an application on one of the first processing unit 110 and the second processing unit 120. In another example, receipt of the instruction to run the application kernel may trigger implementation of the apparatus management module 150. In any regard, the instruction receiving module 210 may receive the instruction to run the application kernel.

At block 304, an application profile for the application may be created, in which the application profile identifies an affinity of the application to be run on the second processing unit 120 and identifies a characterization of an input data set of the application. For instance, the application profile creating module 214 may create the application profile for the application. Particularly, the apparatus management module 150 may use a runtime resource management framework that uses dynamic instrumentation and online workload characterization to create the application profile. As discussed below, the application profile may be used to optimize and schedule execution of application kernels on either or both of the first processing unit 110 and the second processing unit 120.

Figure 4:
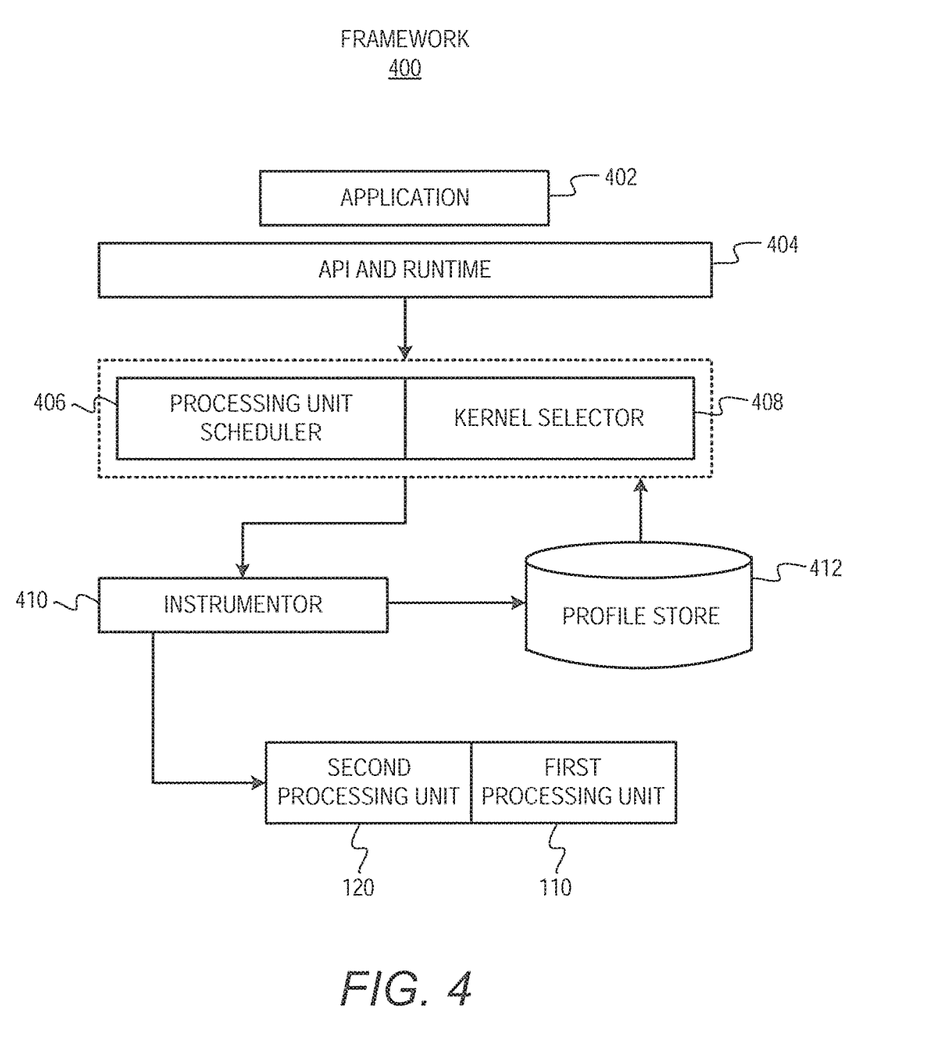
FIG. 4 depicts a runtime resource management framework, according to an example of the present disclosure.

An example of the runtime resource management framework 400 is depicted in FIG. 4. As shown in that figure, an application 402 may interface with a runtime of the framework 400 through an application programming interface (API) 404. The API 404 may leverage the OpenCL runtime to provide cross-platform support for executing computations across the first processing unit 110 and the second processing unit 120. For instance, the framework 400 may maintain a single OpenCL context for both the first processing unit 110 and the second processing unit 120, along with a separate command-queue for each processing unit 110, 120. The API 404 may allow end-users to register their applications with the runtime, which may give the runtime complete control over dispatching work and transferring data between the first processing unit 110 and the second processing unit 120 without requiring any programmer intervention or even rebuild of application binaries.

The processing unit scheduler 406 may invoke the instrumentor 410 to instrument the application 402 during runtime. The instrumentor 410 may embed instrumentation code into the application execution path at runtime to measure a plurality of metrics, which may be customized and/or user-defined. The instrumentation code may be embedded to run transparently to the application during runtime and may not require access to the application's source code. According to an example, the instrumentor 410 may selectively instrument the application by instrumenting only a subset of the wavefronts and specific basic blocks in a kernel. The selective instrumentation may be implemented, for instance, because dynamic instrumentation may have a relatively high overhead that may strongly depend on the capabilities of the underlying hardware. For instance, the characteristics of many data mining kernels, and their input data, may be approximated by selectively instrumenting only the first few iterations of the kernels.

According to an example, the instrumentor 410 may dynamically instrument, e.g., selectively instrument, the application 402, e.g., the OpenCL kernel of the application, to determine various metrics associated with the application. In addition, the instrumentor 410 may characterize the affinity of the application to the second processing unit 120 based upon the determined metrics. By way of example in which the second processing unit 120 is a GPU, the instrumentor 410 may use the metrics determined from the instrumentation to characterize the application's 402 effectiveness in using the GPU single instruction, multiple data (SIMD) execution model, in which the affinity of the application to the GPU may be based upon the characterized affinity. The instrumentor 410 may also use the metrics determined from the instrumentation to classify the application 402 as being either memory-bound or compute-bound.

According to an example, the instrumentor 410 may characterize the affinity of the application to be run on the second processing unit 120 and memory-boundedness through use of multiple instrumentation metrics. For instance, the instrumentor 410 may use an activity factor (AF), which characterizes how well an application is utilizing a processing unit by measuring the degree of control-flow irregularity inherent in a given application's execution run, to determine the affinity of the application to be run on the processing unit. By way of example, the AF may characterize how well the application is utilizing the GPU SIMD parallel execution model. When threads within a wavefront diverge due to a data-dependent control flow statement, the wavefront serially executes each branch path taken, disabling threads that are not on that path. Threads that are not disabled on a given path are considered to be active. Because control-flow irregularity is often data-dependent, the AF for an application may vary for distinct inputs. The AF of the application 402 may be defined as:

$$AF = \frac{\text{executed instructions by all active threads}}{\text{executed instructions by all launched threads}}. \quad \text{Equation (1)}$$

A relatively high AF may generally indicate a uniform or no control-flow irregularity, which may be suited for GPU execution, whereas a relatively low AF may be indicative of a higher degree of control-flow irregularity, which may be better suited for CPU execution. For most data-intensive applications, GPU threads have a one-to-one mapping to the number of input elements that need to be processed. In these cases, the AF may gauge the degree of workload imbalance exhibited by a given application. For instance, the AF may characterize a graph application's regularity. In one regard, the AF of the application may thus be used to characterize the input data of the application as either being regular or irregular.

According to an example, the application 402 may be deemed to have an affinity to be run on the second processing unit 120 versus being run on the first processing unit 110 if the AF of the application 402 exceeds a predetermined threshold. That is, the application 402 may be deemed to have an affinity to be run on the second processing unit 120 if the AF exceeds the predetermined threshold, otherwise, the application 402 may be deemed to have an affinity to be run on the first processing unit 110. The value of the predetermined threshold may be determined through testing and may vary depending upon the characteristics of the first processing unit 110 and the second processing unit 120. By way of particular example, the predetermined threshold is approximately 20%. In another example, the application 402 may be deemed to have an affinity to run on the second processing unit 120 if a variance in the AF exceeds a predetermined threshold value.

The instrumentor 410 may use a memory intensity (MI) metric determination to characterize the memory-boundedness of the application 402. The MI of an application 402 generally characterizes the extent to which the application 402 is memory-bound versus compute-bound. The MI of the application 402 may be defined as:

$$MI = \frac{\text{dynamic global memory instructions}}{\text{total dynamic instructions}}. \quad \text{Equation (2)}$$

Global memory instructions may generally refer to read/write accesses to the global memory subsystem of the second processing unit 120, e.g., the GPU's global memory subsystem. The global memory subsystem may reside in the first processing unit 110, which may be a CPU in various examples. According to an example, the MI metric may be used to determine which two applications should or should not be run concurrently on a CPU and a GPU to avoid memory contention. A relatively high value of MI may imply that an application is memory-bound, while a low value of MI may indicate that an application is compute-bound. An application may be deemed to be memory-bound if the MI of the application exceeds a predefined threshold. That is, the application 402 may be deemed to be memory-bound if the MI exceeds the predefined threshold, otherwise, the application 402 may be deemed to be compute-bound. The value of the predefined threshold may be determined through testing and may vary depending upon the characteristics of the first processing unit 110 and the second processing unit 120. By way of particular example, the predefined threshold is between approximately 5% to approximately 10%.

According to an example, the contention of an application 402, which may be defined as the level to which the application 402 contends with another application being run concurrently in the apparatus 100, may be determined based upon the MI metric value of the application 402. The correlation between the contention of the application 402 and the MI metric value of the application 402 may be determined through a measurement of the slowdown introduced by different types of workloads concurrently running on the first processing unit 110 and the second processing unit 120. For instance, applications 402 with MI's that exceed the predefined threshold may cause a higher level of slowdown when concurrently run than those applications with lower MI's.

According to an example, the application profile creating module 214 may create the application profile for the application 402 based upon the information obtained by the instrumentor 410 in dynamically instrumenting the application 402. Particularly, the application profile for the application 402 may include an identification of the affinity of the application kernel of the application 402, with a particular input data set, to be run on the second processing unit 120 or the first processing unit 110. The application profile for the application 402 may also include an identification of a characterization of input data set of the application 402. For instance, the AF of the application 402 may be used to characterize an input data set for certain types of applications. By way of example, the regularity of an input data set for the application 402 may be defined based on variance in activity factors. In this regard, the input data set of the application 402 may be defined as being regular or irregular depending upon the variance in the AF of the application 402 over multiple iterations. Regular input data sets may be those data sets that do not vary substantially over time and are input-independent. Irregular input data sets may be those data sets that are input-dependent and time-varying such as graph applications. For instance, an irregular graph may be construed as a graph that has a relatively large skew in the distribution of edges across nodes in the graph. Graph applications may include applications that implement graph-based algorithms such as breadth first search (BFS), PageRank, etc.

As application characteristics may depend on the input data set, an application profile may be generated for each distinct pair of application kernel and input data set. In other words, if an application kernel is executed with N distinct input data sets, N distinct application profiles for that application kernel may be generated. Such application profiles may be created because performance of an application 402 by a processing unit 110, 120 may be sensitive to input data sets and thus, the application profiles of the application 402 may vary depending upon whether the input data set is regular or irregular. For instance, one application profile for the application 402 having an input data set that is regular may indicate a different affinity for the application 402 to be run on the second processing unit 120 as compared with another application profile for the same application 402 having another input data set that is irregular.

The application profile for the application 402 may further include an identification of whether the application kernels are characterized as memory-bound or compute-bound, for instance, based upon the MI metrics of the application kernels. The memory boundedness of the application kernels may define the risk of memory contention associated with the application kernels as discussed above.

At block 306, the created application profile or application profiles for the application 402 may be stored in a data store. For instance, the application profile storing module 216 may store the application profile or application profiles for the application 402 in the data store 230, which may be equivalent to the profile store 412 in FIG. 4. According to an example, and as discussed below, the kernel selector 408 may access the application profiles stored in the profile store 412 to determine which of the kernel implementations in the application profiles is to be executed for an application kernel.

Figure 5:
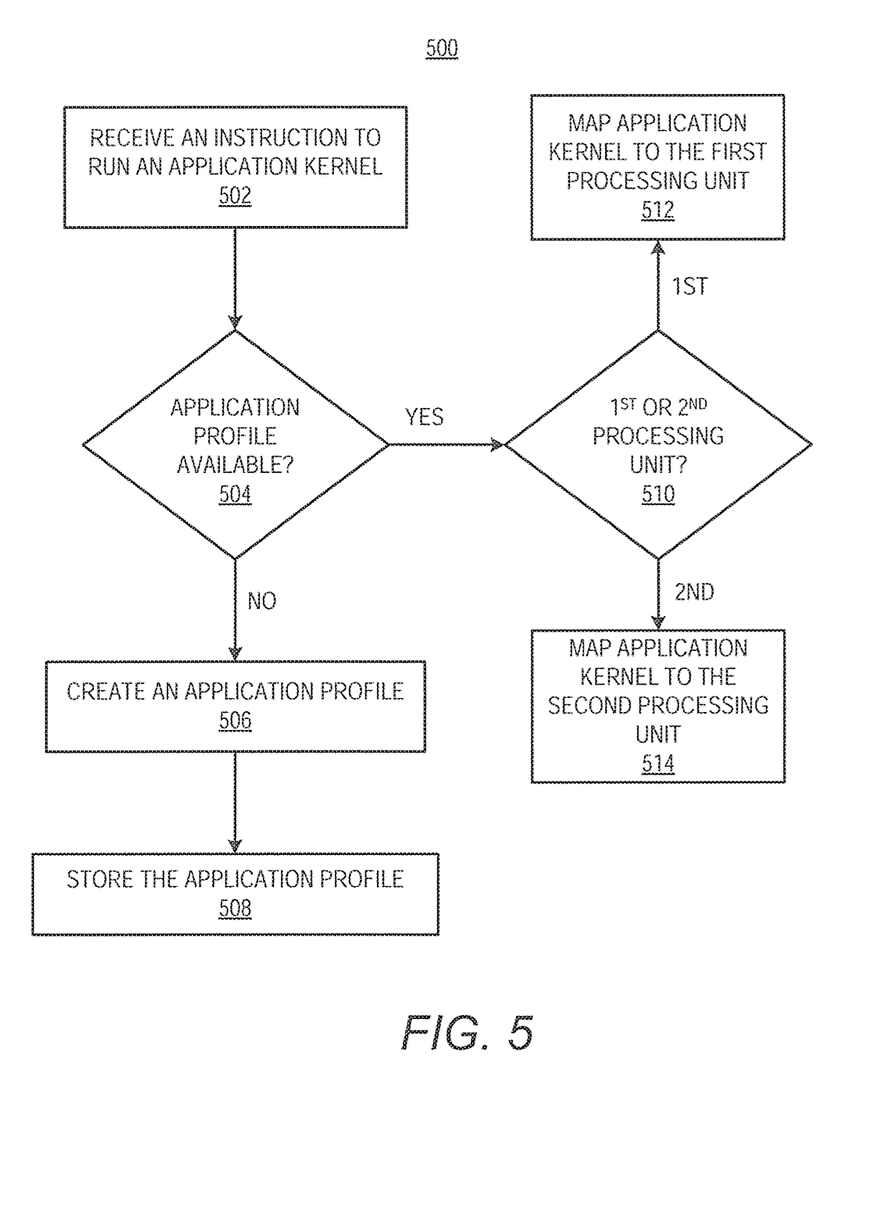

Turning now to the method 500 depicted in FIG. 5, at block 502, an instruction to run an application kernel of an application on an apparatus 100 having a first processing unit 110 integrated with a second processing unit 120 may be received. For instance, following implementation of the apparatus management module 150 in any of the manners discussed above, the instruction receiving module 210 may receive an instruction to run an application on one of the first processing unit 110 and the second processing unit 120. In another example, receipt of the instruction to run the application kernel may trigger implementation of the application apparatus module 150. In any regard, the instruction receiving module 210 may receive the instruction to run the application kernel.

At block 504, a determination may be made as to whether a previously created application profile for the application is available. For instance, the application profile availability determining module 212 may determine whether an application profile for the application is available on the data store 230. The application profile for the application may be stored on the data store 230, for instance, if during a previous iteration, the application profile was created for the application and stored in the data store 230.

In response to a determination that the application profile for the application is not available, at block 506, an application profile for the application may be created as discussed above with respect to block 304. The application kernel of the application may be run on the second processing unit 120 to create the application profile at block 304. In addition, at block 508, the created application profile may be stored in the data store 230 as discussed above with respect to block 306.

However, at block 504, in response to a determination that the application profile for the application is available, a determination may be made at block 510 as to whether the application kernel are to be run on the first processing unit 110 or the second processing unit 120. For instance, the application scheduling module 222 may determine whether the application kernel has an affinity to be run on the second processing unit 120 or has an affinity to be run on the first processing unit 110. As discussed above, the application profile may indicate the affinity of the application kernel based upon the calculated activity factor of the application kernel. That is, for instance, if the activity factor of the application kernel exceeds a predetermined threshold, the application kernel may be identified as having an affinity to be run on the second processing unit 120. Otherwise, the application kernel may be identified as having an affinity to be run on the first processing unit 110.

In response to the application kernel having an affinity to be run on the first processing unit 110, the application kernel may be mapped to the first processing unit 110, as indicated at block 512. Additionally, in response to the application kernel having an affinity to be run on the second processing unit 120, the application kernel may be mapped to the second processing unit 120. For instance, the application mapping module 220 may implement the mapping to cause the application kernel to be run on the selected one of the first processing unit 110 and the second processing unit 120.

According to an example, at block 502, an input data set identifier of the application may also be identified. The instruction receiving module 210 may identify the input data set identifier of the application from, for instance, a determination of the application corresponding to the application kernels. That is, for instance, the instruction receiving module 210 may determine that the application is a graph application and that the input data set is a set of data that the graph application is to access. By way of particular example, the graph application may be a search engine and the input data set may be the set of data upon which the search engine performs a search. In this example, the input data set identifier may identify the actual data set that is to be accessed during runtime of the application kernels. The input data set identifier may additionally or alternatively identify a characteristic of the input data set, such as whether the input data set is regular or irregular.

In this example, a determination may be made at block 504 as to whether a previously created application profile of the application that includes the application kernel and the input data set identifier is available. For instance, the application profile identifying module 218 may scan through the application profiles stored in the data store 230 to determine whether such an application profile exists. In response to a determination that such a profile does not exist, an application profile for the application that includes the application kernel and the input data set identifier may be created at block 506 and stored at block 508. In one regard, an application profile for the application may be available, but the application profile may not include the correct input data set identifier. For instance, the available application profile for the application may include the application kernel, but may be for a different type of input data set. As discussed above, a plurality of application profiles for an application may be created and stored, such that the application profiles are directed to different application kernel and input data set identifier pairs.

However, if an application profile for the application that includes the application kernel and the input data set identifier is determined to be available, blocks 510-514 may be implemented to map the application kernel to the first processing unit 110 or the second processing unit 120 based on the application profiles.

According to an example, at block 510, the application scheduling module 222 may determine that an application kernel with some data input sets have an affinity to be run on the first processing unit 110 and that the application kernel with other input data sets have an affinity to be run on the second processing unit 120 based upon the information contained in the application profiles. In this example, the application profiles for the application may indicate that, for instance, the activity factors for some application kernel and input data set pairs exceed a predetermined threshold and that the application kernels in those application kernel and input data set pairs have affinities to be run on the second processing unit 120. In addition, the application profiles may indicate that the activity factors for other application kernel and input data set pairs fall below the predetermined threshold and that the application kernels in those application kernel and input data set pairs have affinities to be run on the first processing unit 110. In this example, the application mapping module 220 may map the application kernel with some input data sets to the first processing unit 110 at block 512 and the application kernel with other data sets to the second processing unit 120 at block 514.

Figure 6:
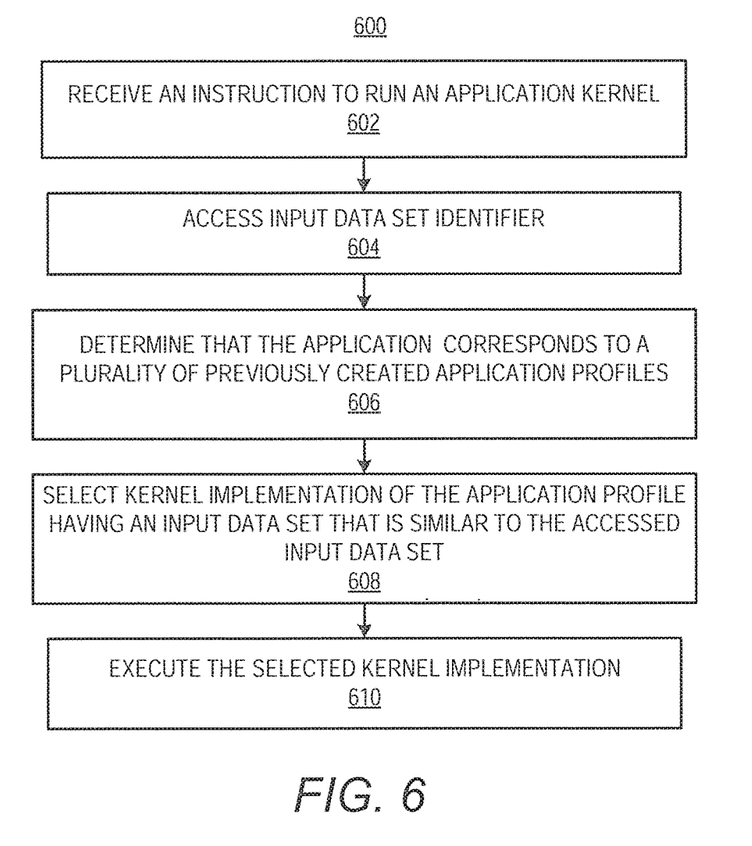

Turning now to FIG. 6, at block 602, an instruction to run an application kernel of an application on an apparatus 100 having a first processing unit 110 integrated with a second processing unit 120 may be received. Block 602 may be similar to block 502 discussed above.

At block 604, an input data set identifier of the application may be identified. The instruction receiving module 210 may identify the input data set identifier of the application from, for instance, a determination of the application corresponding to the application kernel as discussed above with respect to FIG. 5.

At block 606, a determination may be made that the application corresponds to a plurality of previously created application profiles. For instance, the application profile identifying module 218 may determine that a plurality of application profiles for the application have been previously created and stored in the data store 230. As discussed above, a plurality of application profiles for an application may be created that include different application kernel and input data set identifier combinations. A plurality of application profiles for the application may be created because different input data sets may result in the application kernel having different affinities to be run on the second processing unit 120. In addition, the plurality of application profiles may identify which kernel implementation is best suited for execution of the application.

The kernel implementations of a processing unit may be different algorithms that the processing unit may use in running an application kernel. As such, for each application kernel, there may be multiple, alternative kernel implementations. In addition, use of the different kernel implementations on the same application kernel may result in different performance characteristics. That is, use of one kernel implementation for an application kernel may result in a faster performance as compared with the use of another kernel implementation. A particular example is provided for a BFS application for which there are two kernel implementations algorithm 1 (ALG1) and algorithm 2 (ALG2). In this example, ALG1 uses a hierarchical queue to reduce the overheads associated with a single, global task queue for the entire second processing unit 120. ALG1 may offer substantial performance improvements for regular graphs. In addition, ALG2 uses a warp-centric programming method to address workload imbalance, characterized as thread divergence in GPU programming. ALG2 may thus have better performance than ALG1 for irregular graphs, which may be defined as graphs that have a large skew in the distribution of edges across its nodes.

At block 608, the kernel implementation of the previously created application profile having an input data set identifier that is similar to the input data set identifier of the application may be selected. For instance, the application mapping module 220 may select the application profile having the input data set identifier that is similar to the input data set identifier of the application as corresponding to the application. The kernel selector 408 in the framework 400 depicted in FIG. 4 may equivalently be construed as the application mapping module 220.

At block 610, the selected kernel implementation may be executed. For instance, the application scheduling module 222 may implement the selected kernel implementation to execute the application kernel in the second processing unit 120.

Figure 7:
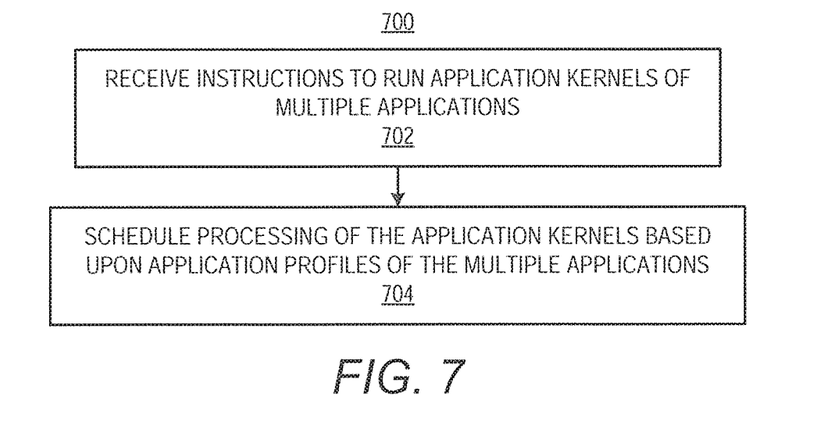

Turning now to FIG. 7, at block 702, instructions to run application kernels of multiple applications on an apparatus 100 having a first processing unit 110 and a second processing unit 120 may be received. For instance, following implementation of the apparatus management module 150 in any of the manners discussed above, the instruction receiving module 210 may receive the instructions to run the application kernels of the multiple applications on the first processing unit 110 and the second processing unit 120. In another example, receipt of the instruction to run the application kernels may trigger implementation of the application apparatus module 150. In any regard, the instruction receiving module 210 may receive the instructions to run the application kernels.

At block 704, processing of the application kernels of the multiple applications on the first processing unit 110 and the second processing unit 120 based upon the affinities of the multiple application kernels identified in the application profiles of the multiple applications while minimizing memory contention among the multiple applications. For instance, the application scheduling module 222 may schedule processing of the application kernels of the multiple applications in a manner that is affinity and contention aware based upon the metrics information contained in the application profiles of the applications. Thus, for instance, the method 700 may be implemented following the creation and storage of the application profiles of the multiple applications. However, if an application does not have a corresponding application profile or an application profile for the application is not available, an application profile for the application may be created and stored as discussed above.

According to an example, the application scheduling module 222 may schedule processing of the application kernels of the multiple applications such that both the first processing unit 110 and the second processing unit 120 are leveraged to maximize system throughput. For instance, the application scheduling module 222 may schedule processing of the application kernels of the multiple applications such that applications are concurrently run on the first processing unit 110 and the second processing unit 120 with minimal idle time. The processing unit scheduler 406 in the framework 400 depicted in FIG. 4 may equivalently be construed as the application scheduling module 222.

According to an example, each of the first processing unit 110 and the second processing unit 120 has a queue for processing tasks (application kernels). When a processing unit 110, 120 finishes a task, the application scheduling module 222 may select a next task for the processing unit 110, 120 in the following manner. The application scheduling module 222 (processing unit scheduler 406) may select the task that has affinity towards the processing unit 110, 120 and exhibits the least contention with the task that is currently running on the other processing unit 110, 120. In other words, the application scheduling module 222 (processing unit scheduler 406) may attempt to schedule tasks on the processing unit 110, 120 on which the tasks will run well, while avoiding co-scheduling two memory-bound tasks. The application scheduling module 222 (processing unit scheduler 406) may use a window and aging threshold to prevent starvation and reduce turnaround time.

The next task may be selected from a fixed size window that contains tasks from the beginning of the queue. A large window size may improve the possibility of finding two least-contending tasks as it gives the application scheduling module 222 (processing unit scheduler 406) more choices. A small window size may limit the amount of tasks executed out-of-order to improve fairness. Additionally, if a task is not scheduled according to its position in the queue as many times as the aging threshold, the application scheduling module 222 (processing unit scheduler 406) may schedule the task next time on the processing unit 110, 120 to which the task has an affinity, even if there is a potential contention.

Some or all of the operations set forth in the methods 300 and 500-700 may be contained as utilities, programs, or subprograms, in any desired computer accessible medium. In addition, the methods 300 and 500-700 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 8:
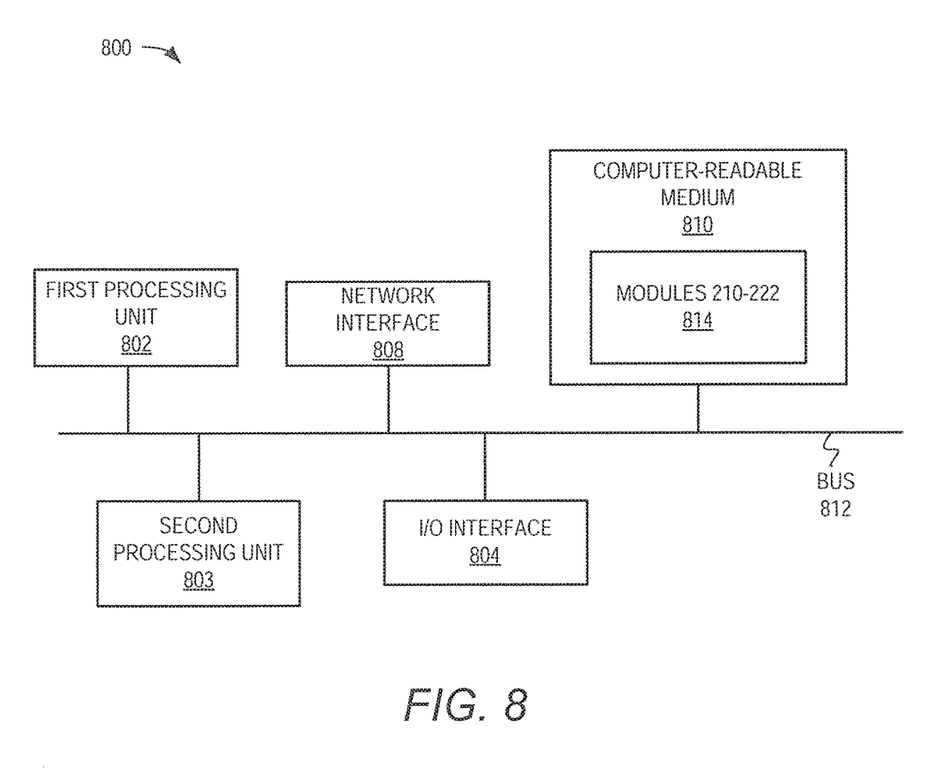
FIG. 8 is schematic representation of a computing device, which may include the apparatus 100 depicted in FIG. 1, according to an example of the present disclosure.

Turning now to FIG. 8, there is shown a schematic representation of a computing device 800, which may include the apparatus 100 depicted in FIG. 1, according to an example. The computing device 800 may include a first processing unit 802, a second processing unit 803, a input/output interface 804, a network interface 808, such as a Local Area Network LAN, a wireless 802.11x LAN, a 3G mobile WAN or a WiMax WAN; and a computer-readable medium 810. Each of these components may be operatively coupled to a bus 812. For example, the bus 812 may be an EISA, a PCI, a USB, a FireWire, a NuBus, or a PDS. The first processing unit 802 and the second processing unit 803 may respectively be equivalent to the first processing unit 110 and the second processing unit 120 depicted in FIG. 1.

The computer-readable medium 810 may be any suitable medium that participates in providing instructions to the first processing unit 802 and the second processing unit 803 for execution. For example, the computer-readable medium 810 may be non-volatile media, such as an optical or a magnetic disk; volatile media, such as memory. The computer-readable medium 810 may also store modules 210-222 of the apparatus management module 150 depicted in FIG. 2. In this regard, the machine readable instructions 814 may include an instruction receiving module 210, an application profile availability determining module 212, an application profile creating module 214, an application profile storing module 216, an application profile identifying module 218, an application mapping module 220, and an application scheduling module 222.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing an apparatus having integrated heterogeneous processing units, said method comprising:
receiving an instruction to run a kernel of an application on the apparatus, wherein the apparatus has a first processing unit integrated with a second processing unit, wherein the second processing unit has different operating characteristics as compared with the first processing unit;
creating an application profile for the application at a runtime of the application kernel on the second processing unit, wherein the application profile identifies an affinity of the application kernel to be run on either the first processing unit or the second processing unit and identifies a type of an input data set of the application based on an activity factor calculation; and
storing the application profile for the application in a data store.

2. The method according to claim 1, wherein creating the application profile comprises:
dynamically instrumenting the application at a runtime of the application kernel in the second processing unit to determine the affinity of the application kernel to the second processing unit and an extent to which the application kernel is memory-bound versus being compute bound.

3. The method according to claim 2, wherein dynamically instrumenting the application further comprises selectively instrumenting the application to reduce overhead associated with the dynamic instrumentation.

4. The method according to claim 2, wherein dynamically instrumenting the application results in a gathering of values pertaining to a number of instructions executed and memory accesses performed, the method further comprising:
determining the affinity of the application kernel based upon a comparison of the gathered values or a variance in the gathered values with predetermined threshold values.

5. The method according to claim 1, further comprising:
determining whether a previously created application profile for the application is available; and
wherein creating the application profile for the application further comprises creating the application profile in response to a determination that a previously created application profile for the application is not available.

6. The method according to claim 1, further comprising:
receiving instructions to run an application kernel of a subsequent application;
identifying an input data set identifier of the subsequent application;
determining whether a previously created application profile for the subsequent application that includes the application kernel and the input data set identifier is available; and
in response to a determination that a previously created application profile for the subsequent application that includes the application kernel and the input data set identifier is not available, creating an application profile for the subsequent application that identifies the application kernel and the input data set identifier.

7. The method according to claim 6, further comprising:
in response to a determination that a previously created application profile for an application and input data set pair that includes the application kernel and the input data set identifier is available, determining, from the previously created application profile, which of the first processing unit and the second processing unit is to process the application kernel of the application with the input data set; and
mapping the application kernel to the first processing unit or the second processing unit based upon the determination of which of the first processing unit and the second processing unit is to process the application kernel with the input data set.

8. The method according to claim 1, further comprising:
identifying an input data set identifier of the application;
determining that the application corresponds to a plurality of previously created application profiles, and wherein the plurality of previously created application profiles corresponds to input data set identifier and application kernel pairs and have different kernel implementations;
selecting a kernel implementation of a previously created application profile based on the input data set identifier of the application; and
executing the selected kernel implementation in running the application kernel of the application.

9. The method according to claim 1, further comprising:
receiving instructions to run application kernels of multiple applications on the first processing unit and the second processing unit of the apparatus, wherein each of the multiple applications is associated with a respective application profile; and
scheduling processing of the application kernels of the multiple applications on the first processing unit and the second processing unit based upon affinities of the multiple applications to be run on the second processing unit identified in the application profiles of the multiple applications while minimizing memory contention among the multiple applications.

10. The method according to claim 1, wherein the application is a graph application and wherein the type of the input data is based on whether the input data is regular or irregular.

11. An apparatus comprising:
a first processing unit;
a second processing unit, wherein the second processing unit has different operating characteristics as compared with the first processing unit;
a memory shared by the first processing unit and the second processing unit over a bus; and
a module to receive an instruction to process a kernel of an application, wherein the module is to create an application profile for the application that identifies an affinity of the application kernel to be processed on either the first processing unit or the second processing unit and identifies a type of an input data set of the application based on an activity factor calculation, and wherein the module is to implement the application profile in determining which of the first processing unit and the second processing unit is to process an application kernel of a subsequently received application.

12. The apparatus according to claim 11, wherein the first processing unit is an integrated central processing unit (CPU) and the second processing unit is a graphics processing unit (GPU).

13. The apparatus according to claim 11, wherein the module is to create the application profile through a selective instrumentation of the application that reduces overhead associated with the instrumentation at a runtime of the application kernel on the second processing unit, to determine an activity factor of the application that characterizes the affinity of the application to be run on the second processing unit, and determine a memory intensity of the application that characterizes an extent to which the application is memory-bound versus being compute-bound.

14. The apparatus according to claim 11, wherein the module is further to receive instructions to run application kernels of multiple applications on the first processing unit and the second processing unit, wherein each of the multiple applications is associated with a respective application profile, and to schedule processing of the application kernels of the multiple applications on the first processing unit and the second processing unit based upon affinities of the multiple applications to be run on the second processing unit identified in the application profiles of the multiple applications while minimizing memory contention in the performance of the multiple applications.

15. A non-transitory computer-readable storage medium on which is stored machine readable instructions that when executed by a processor cause the processor to:
- receive an instruction to run a kernel of an application on an apparatus having a first processing unit integrated with a second processing unit, wherein the second processing unit has different operating characteristics as compared with the first processing unit;
- determine whether a previously created application profile for the application is available; and
- in response to a determination that a previously created application profile for the application is not available, perform a selective dynamic instrumentation of the application at a runtime of the application kernel on the second processing unit; and
- create an application profile for the application based upon the selective dynamic instrumentation, wherein the application profile identifies an affinity of the application kernel to be run on either the first processing unit or the second processing unit and identifies a type of an input data set of the application based on an activity factor calculation.

* * * * *